United States Patent
Romanoff et al.

[11] Patent Number: 5,888,069
[45] Date of Patent: Mar. 30, 1999

[54] MOBILE MODULAR SIMULATOR SYSTEM

[75] Inventors: Christopher E. Romanoff, Milford; Christopher L. Jerman, New Britain, both of Conn.

[73] Assignee: Sikorsky Aircraft Corporation, Stratford, Conn.

[21] Appl. No.: 996,603

[22] Filed: Dec. 23, 1997

[51] Int. Cl.[6] .............................. G09B 9/02; G09B 9/46
[52] U.S. Cl. ............................................. 434/33; 434/29
[58] Field of Search .................. 434/29, 30, 33, 434/62

[56]  References Cited

U.S. PATENT DOCUMENTS

| | | | |
|---|---|---|---|
| H1728 | 5/1998 | Kelso et al. | 434/30 X |
| 3,486,242 | 12/1969 | Aronson | 434/29 |
| 3,862,358 | 1/1975 | Wolff | 434/29 X |
| 3,984,924 | 10/1976 | Myles et al. | 434/29 |
| 5,275,565 | 1/1994 | Moncrief | 434/29 |
| 5,509,806 | 4/1996 | Ellsworth | 434/29 |
| 5,607,306 | 3/1997 | Bothwell | 434/29 |

FOREIGN PATENT DOCUMENTS

| | | | |
|---|---|---|---|
| 204296 | 8/1993 | Japan | 434/32 |
| 2006071 | 1/1994 | Russian Federation | 434/29 |

*Primary Examiner*—John A. Ricci
*Attorney, Agent, or Firm*—Adam C. Solomon

[57]  ABSTRACT

A mobile modular simulator system comprising a mobile base, a multimedia subsystem module demountably coupled with the mobile base, and a controller subsystem module demountably coupled with the mobile base, wherein the controller subsystem is configured for electronic coupling with the multimedia subsystem module for receiving input therefrom and for delivering output thereto to simulate an operating environment.

15 Claims, 3 Drawing Sheets

MOBILE MODULAR SIMULATOR SYSTEM

TECHNICAL FIELD

This invention relates generally to computer-based simulators, and more particularly, to a mobile modular simulator system comprising a mobile base having a multimedia subsystem module and a controller subsystem module demountably coupled therewith.

BACKGROUND OF THE INVENTION

Computer-based simulators are increasingly used to assist in the development and testing of aircraft and land-based vehicles, and in particular, to assist in the training of pilots and operators. A typical computer-based simulator system for a helicopter comprises a helicopter cockpit fixed to a surface and disposed in combination with a display screen, video projection subsystem, and audio delivery subsystem. The video projection subsystem and audio delivery subsystem are electronically connected to a programmable computer subsystem that generates helicopter models, scenarios, images, and sounds for the simulations. In addition, the computer subsystem is electronically connected to the cockpit to receive input from the cockpit's flight controls, and to deliver data to the cockpit's flight instrumentation.

In the prior art, computer-based simulators are typically installed in conventional buildings to provide environmental controls and electrical power for the simulator subsystems, and also to provide access to the computer subsystems, which typically occupy large volumes of space. A drawback to prior art computer-based simulators is that these simulators are "fixed" and cannot be transported to new locations without first dismantling them. There is a need in certain simulator applications (e.g., battlefield simulations) to group multiple simulators together to carry-out accurate combined mission simulations. In addition, because the number of computer-based simulators are limited by their expensive nature, there is also a need to make a limited number of simulators accessible to large numbers of users in diverse geographic locations. The typical fixed computer-based simulator does not properly address these needs.

In U.S. Pat. No. 5,509,806, PORTABLE MULTIPLE MODULE SIMULATOR APPARATUS AND METHOD OF USE, granted to Ellsworth, and assigned to Crusade for Kids, Inc. (hereinafter '806 patent), a method and apparatus are disclosed for multimedia simulation of the sounds, sights, and motions associated with various real life experiences. Roadable trailers having modules are combined to form a platform or support for an exoskeleton in the shape of various structures such as a spaceship, moon base, cave, mountain, vehicle, airplane, helicopter, ship, submarine, etc. The modules are provided with cameras, viewing screens, audio equipment and actual and optical motion imparting mechanisms for real-time point-of-access imagery simulating take-off, landing, turns, and hover-type turns from the environment surrounding the simulator. External image gathering cameras are attached to a movable support to provide relative motion point-of-access imagery.

A drawback to the portable simulator disclosed in the '806 patent is that this type of portable simulator is designed primarily for entertainment use, and is not configured for fully-realistic simulator experiences. For example, the portable simulator disclosed in the '806 patent is not configured to receive a helicopter, aircraft, or tank cockpit, or a vehicle interior. However, even if such a cockpit or interior was placed within the portable simulator disclosed in the '806 patent, the cockpit/interior, and the corresponding computer equipment would be housed within one trailer. Therefore, although the entire simulator is portable, it still requires considerable disassembly of some simulator systems to remove/replace the cockpit, audio, video, or computer systems.

DISCLOSURE OF THE INVENTION

It is therefore an object of the present invention to provide a computer-based simulator system that is fully portable.

Another object of the present invention is to provide a portable computer-based simulator system that provides configuration flexibility for providing a plurality of simulation environments.

These objects and others are achieved in the present invention by a mobile modular simulator system comprising a mobile base, a multimedia subsystem module demountably coupled with the mobile base, and a controller subsystem module demountably coupled with the mobile base, wherein the controller subsystem module is configured for electronic coupling with the multimedia subsystem module for receiving input therefrom and for delivering output thereto to simulate an operating environment.

Still other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BEST MODE FOR CARRYING OUT THE INVENTION

Figure 1:
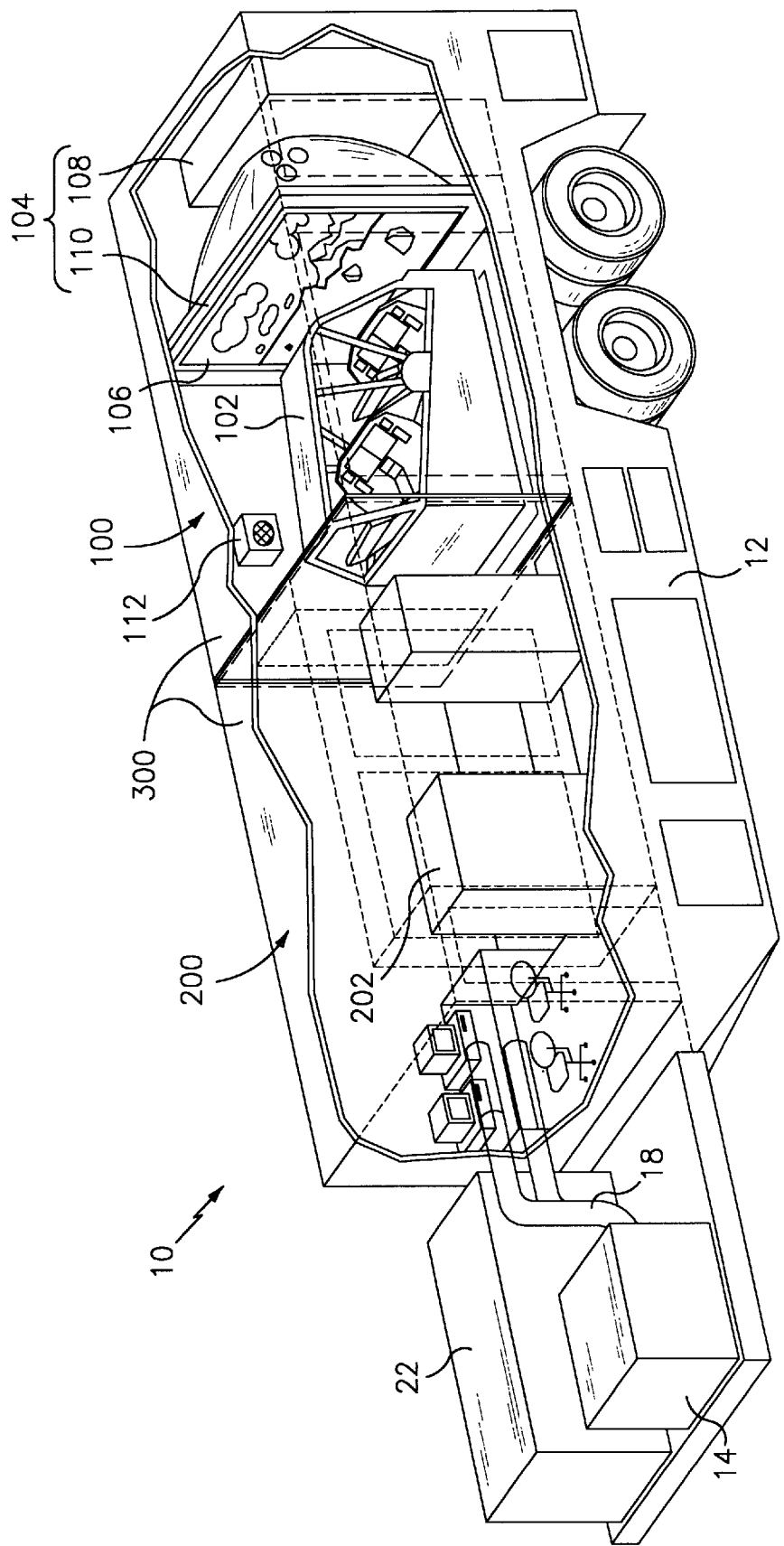
FIG. 1 is a perspective view, partly broken away, of a mobile modular simulator system embodying features of the present invention.
Figure 2:
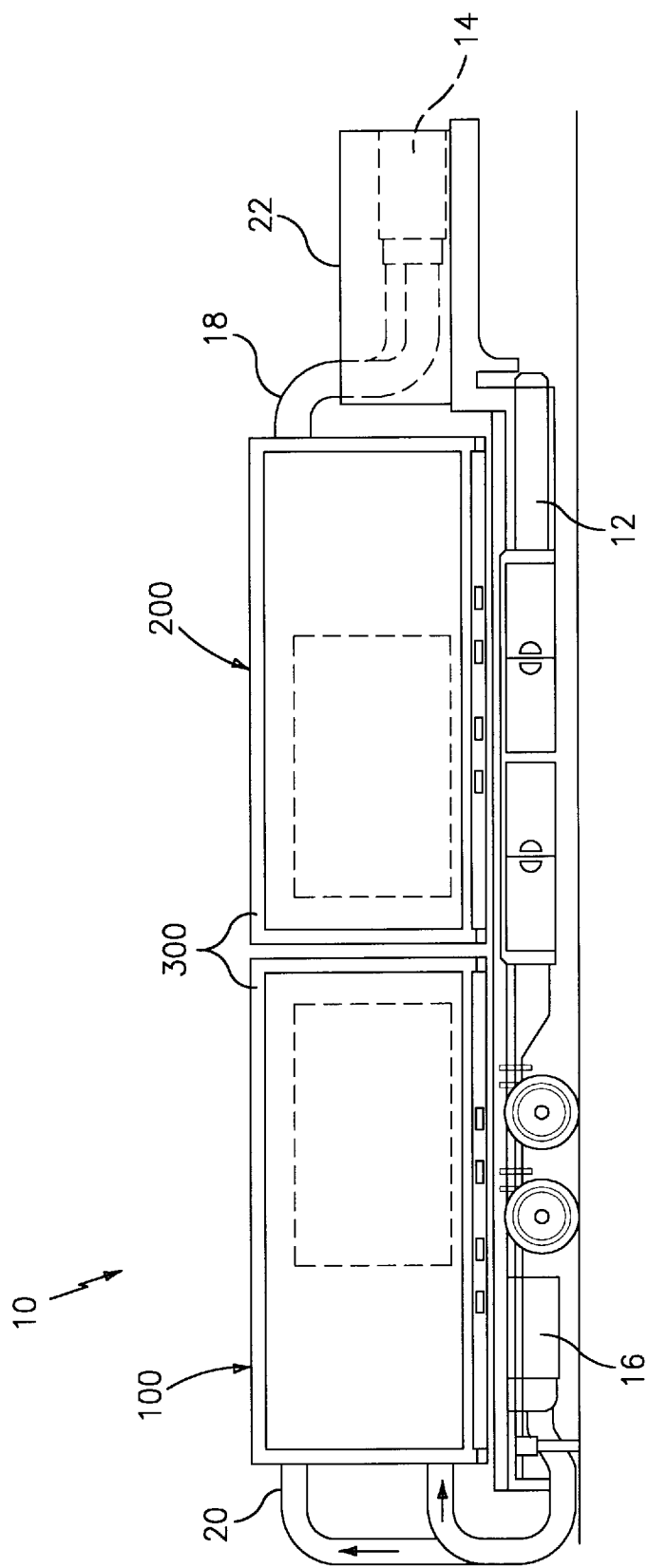
FIG. 2 is a side view of the mobile modular simulator of FIG. 1.

Referring now to the drawings wherein like reference characters identify corresponding or similar elements throughout the several views, FIGS. 1 and 2 depict a mobile modular simulator system 10 embodying features of the present invention. The mobile modular simulator system 10 comprises a mobile base 12, a multimedia subsystem module 100 demountably coupled with the mobile base 12, and a controller subsystem module 200 demountably coupled with the mobile base 12.

In the described embodiment, the mobile base 12 comprises a conventional roadable flatbed trailer of a type configured for connection to a truck cab (not shown). In alternative embodiments, the mobile base 12 can comprise a flatbed or platform disposed in combination with a land-based vehicle, rail car, barge, self-propelled seafaring ship, aircraft cargo hold, helicopter hoisting means, or any other means known in the art for facilitating land, sea, or airborne mobility of the mobile modular simulator system 10.

In the described embodiment, the multimedia subsystem module 100 includes a helicopter cockpit 102, and an image display subsystem 104 disposed in combination with the helicopter cockpit 102 for displaying images 106 that provide a simulated helicopter operating environment. Specifically, in the described environment, the image display subsystem 104 comprises a conventional video projector 108 disposed in combination with a rear-projection screen 110, wherein the screen 110 is positioned relative to the helicopter cockpit 102 such that the images 106 displayed on the screen 110 are viewable by pilots (not shown) seated in the helicopter cockpit 102.

In alternative embodiments, the image display subsystem 104 can comprise a cathode ray tube monitor, collimated display, or any other means or combination of means known in the art for displaying the images 106 in combination with the helicopter cockpit 102.

In the described embodiment, the multimedia subsystem module 100 further includes an audio delivery subsystem 112 disposed in combination with the image display subsystem 104 for providing audio in combination with the images 106 to enhance the simulated helicopter operating environment experienced by the pilots in the helicopter cockpit 102. Specifically, the audio delivery subsystem 112 comprises conventional speakers for generating the audio.

The controller subsystem module 200 includes a programmable computer 202 configured for receiving input and for delivering output to the components of the multimedia subsystem module 100. In the described embodiment, the programmable computer 202 is electronically coupled to the helicopter cockpit 102, the image display subsystem 104, and the audio delivery subsystem 112 such that the programmable computer 202 is capable of receiving input (e.g., flight control inputs) from the helicopter cockpit 102 and is capable of delivering output in response thereto to the image display subsystem 104 and audio delivery subsystem 112. It will be appreciated that the programmable computer 202 includes conventional hardware and software configured for generating the simulation models, scenarios, images 106, and sounds in response to pilot input to deliver the simulated helicopter operating environment.

In alternative embodiments, the controller subsystem module 200 can include multiple programmable computers or other combinations of hardware and software that are capable of receiving input from the helicopter cockpit 102 and capable of delivering output in response thereto to the image display subsystem 104 and audio delivery subsystem 112.

In the described embodiment, the multimedia subsystem module 100 and the controller subsystem module 200 are each defined by a cargo container housing 300 that is configured for demountable coupling with the roadable flatbed trailer 12. Specifically, in the described embodiment, both the cargo container housings 300 and the roadable flatbed trailer 12 are conventionally configured in accordance with specifications issued by the International Organization of Standards (ISO) for cargo containers, i.e., the dimensions and methods of demountable coupling. In alternative embodiments, the multimedia subsystem module 100, controller subsystem module 200, and mobile base 12 can be configured in any conventional arrangement for demountably coupling the modules 100, 200 to the mobile base 12.

In the described embodiment, the mobile modular simulator system 10 includes air conditioning units 14, 16 coupled with ducts 18, 20 for providing cool air to the multimedia subsystem module 100 and the controller subsystem module 200. In addition, the mobile modular simulator system 10 includes a generator 22 for providing electrical power to the multimedia subsystem module 100, the controller subsystem module 200, and the air conditioning units 14, 16. In alternative embodiments, external HVAC and electrical sources can be coupled to the multimedia subsystem module 100 and the controller subsystem module 200.

Figure 3:
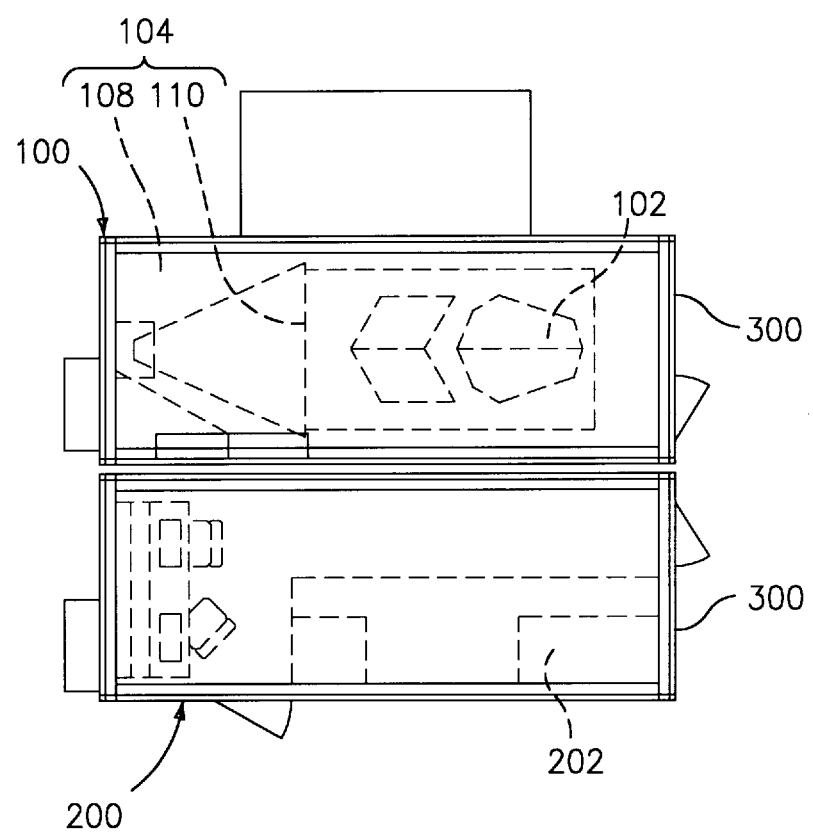
FIG. 3 is a plan view of one configuration of the subsystem modules of FIG. 1.

In the described embodiment, as depicted in FIGS. 1 and 2, when the multimedia subsystem module 100 and the controller subsystem module 200 are coupled to the roadable flatbed trailer 12, the modules 100, 200 are longitudinally aligned. When the modules 100, 200 are demounted from roadable flatbed trailer 12, they can be reconfigured in a similar longitudinal alignment (not shown), or in a side-by-side configuration as depicted in FIG. 3. In either configuration, the cargo container housings 300 can include removable panels or doors (not shown) for facilitating movement of individuals from one of the modules 100, 200 to the other.

It will be appreciated that the modular nature of the mobile modular simulator system 10 facilitates the removal of the multimedia subsystem module 100, the controller subsystem module 200, or both from the mobile base 12, and facilitates the replacement therefor with different multimedia subsystem modules 100 or controller subsystem modules 200.

In alternative embodiments, the helicopter cockpit 102 in the multimedia subsystem module 100 can be replaced with an aircraft cockpit, tank cockpit, vehicle interior, or any other type of control center for an airborne, seafaring, or land-based vehicle. In yet other alternative environments, the multimedia subsystem module 100 can contain any internal arrangement necessary for a variety of simulation or training environments, including police and military personnel training. It will be appreciated that for these alternative configurations of the multimedia subsystem module 100, the controller subsystem module 200 can be reprogrammed or replaced to provide the appropriate corresponding simulation environment.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A mobile modular simulator system comprising:
   (a) a mobile base;
   (b) a multimedia subsystem module defined by a first cargo container housing, said first cargo container housing being configured for detachable mounting upon said mobile base; and
   (c) a controller subsystem module defined by a second cargo container housing, said second cargo container housing being configured for detachable mounting upon said mobile base, said controller subsystem being configured for electronic coupling with said multimedia subsystem module for receiving input therefrom and for delivering output thereto to simulate an operating environment.

2. The mobile modular simulator system of claim 1, wherein said multimedia subsystem module includes
   (a) a helicopter cockpit; and
   (b) an image display subsystem disposed in combination with said helicopter cockpit for displaying images that provide a simulated helicopter operating environment.

3. The mobile modular simulator system of claim 2, wherein said multimedia subsystem module includes an audio delivery subsystem disposed in combination with said image display subsystem for providing audio in combination with said images to enhance said simulated helicopter operating environment.

4. The mobile modular simulator system of claim 2, wherein said controller subsystem module includes a programmable computer subsystem configured for receiving said input from said cockpit, and for delivering said output to said image display subsystem.

5. The mobile modular simulator system of claim 1, wherein said controller subsystem module includes a programmable computer subsystem configured for receiving said input and for delivering said output to said multimedia subsystem module.

6. The mobile modular simulator system of claim 1, wherein said multimedia subsystem module includes
   (a) an aircraft cockpit; and
   (b) an image display subsystem disposed in combination with said aircraft cockpit for displaying images that provide a simulated aircraft operating environment.

7. The mobile modular simulator system of claim 6, wherein said multimedia subsystem module includes an audio delivery subsystem disposed in combination with said image display subsystem for providing audio in combination with said images to enhance said simulated aircraft operating environment.

8. The mobile modular simulator system of claim 1, wherein said multimedia subsystem module includes
   (a) a tank cockpit; and
   (b) an image display subsystem disposed in combination with said tank cockpit for displaying images that provide a simulated tank operating environment.

9. The mobile modular simulator system of claim 8, wherein said multimedia subsystem module includes an audio delivery subsystem disposed in combination with said image display subsystem for providing audio in combination with said images to enhance said simulated tank operating environment.

10. The mobile modular simulator system of claim 1, wherein said multimedia subsystem module includes
    (a) a vehicle interior; and
    (b) an image display subsystem disposed in combination with said vehicle interior for displaying images that provide a simulated vehicle operating environment.

11. The mobile modular simulator system of claim 10, wherein said multimedia subsystem module includes an audio delivery subsystem disposed in combination with said image display subsystem for providing audio in combination with said images to enhance said simulated vehicle operating environment.

12. A mobile modular helicopter simulator system comprising:
    (a) a roadable flatbed trailer;
    (b) a multimedia subsystem module configured for detachable mounting upon said roadable flatbed trailer, said multimedia subsystem module including
        a helicopter cockpit, and
        an image display subsystem disposed in combination with said helicopter cockpit for displaying images that provide a simulated helicopter operating environment; and
    (c) a controller subsystem module configured for detachable mounting upon said roadable flatbed trailer, said controller subsystem being configured for electronic coupling with said multimedia subsystem module for receiving input therefrom and for delivering output thereto to simulate a helicopter operating environment.

13. The mobile modular simulator system of claim 12, wherein said multimedia subsystem includes an audio delivery subsystem disposed in combination with said image display subsystem for providing audio in combination with said images to enhance said simulated helicopter operating environment.

14. The mobile modular simulator system of claim 12, wherein said controller subsystem module includes a programmable computer subsystem configured for receiving input from said cockpit, and for delivering output to said image display subsystem.

15. The mobile modular simulator of claim 1, wherein said mobile base comprises a roadable flatbed trailer.

* * * * *